United States Patent
Young et al.

(10) Patent No.: US 6,300,261 B1
(45) Date of Patent: Oct. 9, 2001

(54) SELF-HEALING ARTICLES RESISTANT TO OXIDIZING AGENTS

(75) Inventors: John B. Young, Woodbury; Loren L. Barber, Lake Elmo, both of MN (US)

(73) Assignee: 3M Innovative Properties Company, Saint Paul, MN (US)

(*) Notice: Subject to any disclaimer, the term of this patent is extended or adjusted under 35 U.S.C. 154(b) by 0 days.

(21) Appl. No.: 09/197,132

(22) Filed: Nov. 20, 1998

(51) Int. Cl.$^7$ ..................................................... D04H 1/00
(52) U.S. Cl. ...................... 442/328; 442/329; 442/337; 442/417; 428/912
(58) Field of Search .................................... 442/328, 329, 442/417, 337; 428/912

(56) References Cited

U.S. PATENT DOCUMENTS

| | | |
|---|---|---|
| 1,854,509 | 4/1932 | Fish . |
| 2,801,461 | 8/1957 | Kusters ................................. 29/120 |
| 3,490,119 | 1/1970 | Fukuyama et al. .................... 29/132 |
| 3,646,651 | 3/1972 | McGaughey et al. ................. 29/130 |
| 3,664,904 * | 5/1972 | Cook ..................................... 161/50 |
| 3,800,381 | 4/1974 | Brafford ................................ 29/132 |
| 3,853,677 | 12/1974 | Kai ........................................ 161/36 |
| 4,336,291 * | 6/1982 | Broadhurst et al. ................. 428/101 |
| 4,368,568 | 1/1983 | Watanabe .............................. 29/130 |
| 4,400,418 | 8/1983 | Takeda et al. ......................... 428/36 |
| 4,475,275 | 10/1984 | Edwards ................................ 29/110 |
| 4,583,966 | 4/1986 | Ocker et al. ......................... 493/374 |
| 4,669,163 | 6/1987 | Lux et al. ............................. 29/125 |
| 5,247,740 | 9/1993 | Curtis et al. ..................... 29/895.213 |
| 5,525,387 | 6/1996 | Rossi ................................... 428/36.1 |
| 5,549,967 | 8/1996 | Gstrein ................................ 428/229 |
| 6,042,918 * | 3/2000 | Appelt et al. ......................... 428/64 |

FOREIGN PATENT DOCUMENTS

| | | | |
|---|---|---|---|
| 2 401 080 | 8/1978 | (FR) | ............................. B65G/39/00 |
| 7-316854 | 12/1995 | (JP) | ................................ C23G/3/02 |
| WO 97/44513 | 11/1997 | (WO) | ............................ D04H/13/00 |

* cited by examiner

*Primary Examiner*—Terrel Morris
*Assistant Examiner*—Norca L. Torres
(74) *Attorney, Agent, or Firm*—Gregory D. Allen

(57) ABSTRACT

Self-healing articles resistant to oxidizing agents and useful for surface conditioning of sheets, especially metal sheets, are described. The articles comprise a plurality of compacted, stacked non-woven web elements, the web elements each comprising entangled fibers bonded together at points of mutual contact by a bonding agent. The article is resistant to an oxidizing agent or agents, has a Shore A hardness in the range of 70 to 93 and a void volume in the range of 2 to 30 percent. The non-woven articles can be configured into any of a variety of convenient and useful shapes, such as roll shapes, slab or bar shapes. The methods of making these articles are also described.

39 Claims, 2 Drawing Sheets

SELF-HEALING ARTICLES RESISTANT TO OXIDIZING AGENTS

The present invention relates to self-healing articles resistant to oxidizing agents useful in the surface conditioning of sheets (e.g., metal sheets) and to processes of making such articles.

BACKGROUND OF THE INVENTION

Rotatable surface conditioning rolls ("mill rolls") are commonly used in the manufacturing and processing of metal sheets and coils in continuous production lines. During the processing of metal sheets, mill rolls are generally utilized in so-called "wringer applications" as well as "oiler applications".

In wringer applications, mill rolls and like articles are used to prevent the cross contamination of treating solutions. For example, during manufacture of metal sheets many process operations use a variety of treating solutions designed to variously clean, degrease, remove scale, preserve, rinse, surface etch, lubricate, and/or protect a metal surface. During these operations, it is important that mill rolls prevent the contamination of these often incompatible treating solutions. Thus, mill rolls provide wringing ("damming") operations at surfaces of metal sheets to remove excess treating solution from metal surfaces as metal strips exit each treatment tank. The wringing operation prevents the inadvertent mixing of treating solutions. Wringer arrangements may include mill rolls made of conventional rotatable rubber or made of non-woven materials as well as wiper bars made of felt or cork.

During a surface conditioning process, metal sheets move rapidly over rotatable mill rolls at a rate of approximately 200–1200 feet/minute. The relatively non-compressible nature of rubber mill rolls, unlike the web construction of non-woven mill rolls, for example, makes them susceptible to cut propagation and other structural damage at the nip of a roll. Additionally, the surfaces of rolls are easily torn, gouged, or cut by edges of splices in the metal sheets. Once damaged, the initial cut, tear, or gouge in the roll will usually enlarge due to compressive forces at the nip and tension forces on either side of the nip. As a roll becomes increasingly damaged, a roll's ability to act as a wringer decreases and treating solutions may pass through the roll. Chemicals of one treatment tank are then inadvertently mixed with chemicals of another chemical treatment tank and may eliminate a surface modification activity of an initially pure chemical. If a treatment tank is contaminated by another chemical, the contaminated chemical mixture will have to be replaced with new chemical or chemicals. Discarding the contaminated chemicals may be difficult, raising environmental concerns. Also, frequent repair (e.g., surface dressing) or replacement of these articles has been required, thereby creating unscheduled production line downtimes with associated losses and costs.

When production lines are stopped, the rolls on the lines become dried as the sheets of metal are no longer moving and carrying liquid to the rolls. Non-woven rolls absorb liquid because they are porous and have a large void volume. The liquid from the surface modification process fills the void volume when the production line is in operation. When the production line operation stops, the liquid in the roll may precipitate and change the physical characteristics of the roll. Typically, the roll becomes stiff and may have to be replaced before production begins.

In some processes of modifying the surface of metal sheets, the last steps may include a passivating treatment comprising oxidizing acids. The oxidizing acids react with the surface of the metal to make the metal surface less reactive with its environment. Unfortunately, the oxidizing acids also react with the rolls and the rolls may loose physical integrity. A roll used in the passivating treatment step usually performs an application function of applying a thin layer of oxidizing acid to the surface of the metal sheets being treated. The application of a uniform layer of oxidizing acid is necessary to avoid problems. Excess oxidizing acid results in spots appearing on the surface of the metal sheets. Not enough oxidizing acid results in paints or other coatings not adhering well to the metal surface.

SUMMARY OF THE INVENTION

The present invention provides self-healing articles, preferably non-woven articles in the form of a roll, suited for the surface conditioning of sheets. These articles, when cut or torn during a surface modification process, are able to maintain wringer characteristics by preventing the passage of treating solution through the roll. Because these non-woven articles act like wringers when damaged, they have an increased life span; and if used, will result in fewer roll replacements and unscheduled production line downtimes. The chances of chemical contamination between treating solutions are also minimized.

The articles of the present invention are also resistant to oxidizing agents, such as chromic acid, nitric acid, or combinations thereof. Chromic acid is used in the steel industry to modify the surface of steel sheets. The articles of the present invention are preferably shaped in the form of a roll and may be used in a passivating treatment step and perform an application function of applying a thin layer of oxidizing acid to the surface of the metal sheets being treated. The layer of oxidizing acid applied is preferably chromic, nitric acid, phosphoric, or combinations thereof.

As mentioned, the present invention provides a self-healing article suited for use in the surface conditioning of sheets. An article comprises a plurality of stacked, compacted web elements, with each web element comprising entangled fibers bonded together at points of mutual contact by a bonding agent. The self-healing article is resistant to oxidizing agents and has a Shore A hardness in the range of 70 to 93 and (preferably, 75 to 85) a void volume in the range of 2 to 30 percent (preferably, 5 to 20 percent). It is preferred that the web is made of non-woven material.

The present invention also provides a self-healing roll, resistant to oxidizing agents, suited for surface conditioning of sheets. The roll comprises a cylindrical body supported on its cylindrical axis for rotation. The cylindrical body comprises a plurality of compacted, stacked, and disc-shaped web elements. Each web element comprises entangled fibers, wherein a bonding agent bonds adjacent fibers in each web element together at points of mutual contact. The roll is resistant to oxidizing agents and has a Shore A hardness in the range of 70 to 93 (preferably, 75 to 85) and a void volume in the range of 2 to 30 percent (preferably, 5 to 20 percent). It is preferred that the web elements are made of non-woven materials.

The present invention also provides a process for making a self-healing and non-woven article suited for the surface conditioning of sheets. The process provides a plurality of non-woven web elements, the web elements comprising entangled fibers bonded at their points of mutual contact by a bonding agent. The plurality of non-woven web elements are stacked into a pile. Optionally, water may be added to the stacked non-woven web elements. The pile of web elements are compacted under a compaction force. The pile of web elements are restrained in its compacted configuration to form an article. The article is self-healing, resistant to oxidizing agents, and has a Shore A hardness in the range of 70 to 93 (preferably, 75 to 85) and a void volume in the range of 2 to 30 percent (preferably, 5 to 20 percent).

The preferred process for making a self-healing and non-woven article suited for the surface conditioning of sheets includes an additional step in addition to those described above. The step comprises heating the pile in its compacted configuration to an elevated temperature to integrally bond the layers.

As used herein:

"Chemically resistant" in referring to the fibers used in the articles of the invention, refers to the ability of a fiber to tolerate exposure to the conditions in use without significant degradation.

"Oxidizing agent" refers to any compound that spontaneously evolves oxygen either at room temperature or under slight heating. The term includes such chemicals as peroxides, chlorates, perchlorates, nitrates, and permanganates.

"Resistance to oxidizing agents" refers to the ability of the article to remain functionally unchanged when used under wringing conditions in a continuous steel coil treating process. The article is exposed to one or more of the oxidizing acids commercially available under the trade designations "Bonderite 1310" from Henkel Corporation; and "Oakite Okemcote F1" from Oakite Products, Inc.; or the like, for a period of at least 5 weeks.

"Self healing" refers to the ability to quickly re-establish an essentially smooth, continuous surface following a severe damage event without removing the article from use.

"Surface conditioning" encompasses solution stripping (e.g., wringing applications), thin film coating (e.g., oiling applications), and like operations, as performed on surfaces of sheets, especially metal sheets (e.g., aluminum sheets).

DETAILED DESCRIPTION OF THE PREFERRED EMBODIMENTS OF THE INVENTION

Figure 1:
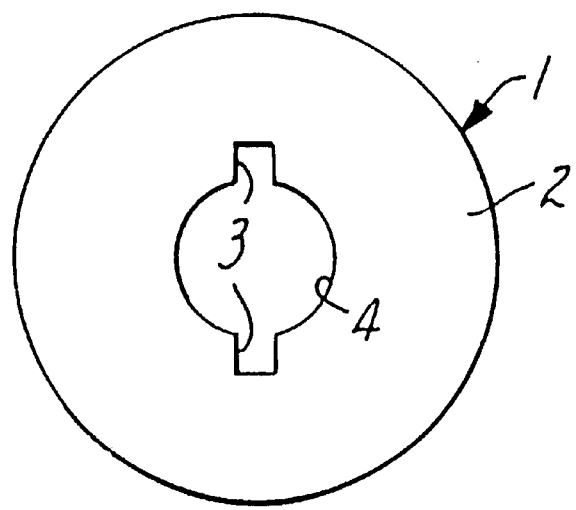
FIG. 1 shows a top plan view of a disc-shaped web element segment used to make the roll of the invention.

The present invention provides a variety of surface conditioning articles that are self-healing and resistant to oxidizing agents. The articles are preferably in the shape of a disc or a roll, and used in the surface modification of metal sheets in the presence of oxidizing agents. An article of the present invention comprises at least one web element. A web element comprises a fiber and a bonding agent. A roll is constructed using a plurality of web elements. Although the structural details of the preferred embodiment are described in the context of rolls, the articles of the invention may be provided in a variety of configurations such as wiper bars and the like. In describing the preferred embodiment, reference is made to the drawings wherein structural features are identified with reference numerals.

Referring FIG. 1, a disc 1 comprising a die cut non-woven web element 2 is shown. Disc 1 is an annulus having a centered opening 4 with opposed slots 3 to fit over a key element on a support shaft. Disc 1 is a portion of a non-woven web element comprising fibers bonded to one another at their points of mutual contact by a suitable bonding agent. The fibers of the non-woven web element 2 preferably are chemically resistant.

Figure 2:
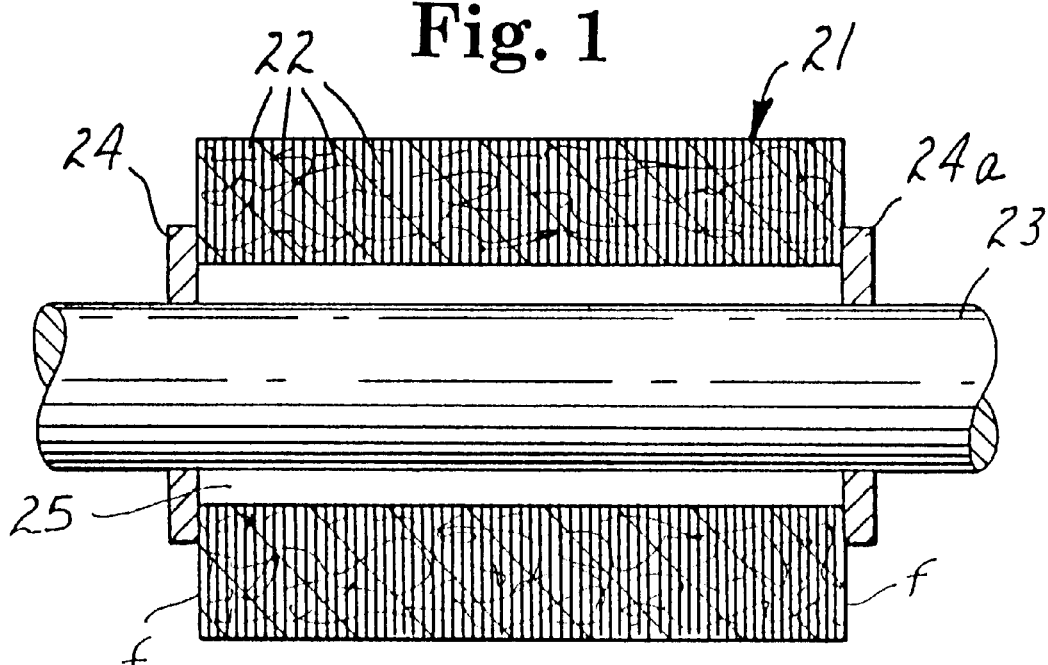
FIG. 2 is a view, partially in cross-section, of a roll made in accordance with the present invention and disposed on a keyed shaft.

As shown in FIG. 2, a roll 21 (e.g., a mill roll) according to the invention is provided as a compacted pile of non-woven disc elements 22 disposed along support shaft 23.

The shaft 23 may include one or more longitudinally extending drive keys 25, or other slots or appendages, to physically engage the opposed slots of the individual disc elements 22 (e.g., slots 3 of FIG. 1). This construction provides a rotatable support for the roll 21 while the keys 25 prevent significant rotational movement of the roll 21 relative to the shaft 23. Although positive keys 25 are depicted on the shaft 23 of FIG. 2, it will be appreciated that a "reverse key" keyway configuration could also be provided wherein one or more projections in the periphery of the central opening (e.g., opening 4, FIG. 1) of the disc are constructed to project into a corresponding slot on the shaft. A plurality of discs 22 are compacted and then restrained in their compacted configuration to form a roll 21.

Rolls made in accordance with the invention, such as roll 21, can be used alone or in combination with one or more rolls of similar or different constructions to provide a multiple roll set in any conventional configuration as may be used to treat a strip of material such as metal sheet, for example.

As mentioned, web elements, preferably non-woven web elements, are used to make rolls. Non-woven web elements are constructed, in part, of air-laid, spunbond, wet-laid, crosslapped, carded, or a combination of these fibers. A non-woven web element suitable for the present invention comprises 50 percent by weight or less of fiber and about 60–600 grams per meter$^2$.

The fibers of the non-woven web elements preferably are chemically resistant and may comprise any of a variety of natural, organic, or inorganic fiber materials, depending on the expected harshness of the chemical environment to be encountered by the finished article, for example. Polyolefin fibers, and especially isotactic polypropylene fibers, are most preferred in the practice of the invention because of their resistance to harsh chemicals and their desirable physical properties in surface conditioning environments (e.g., flexibility and low brittleness).

The articles of the invention, made with non-woven web elements of polyolefin fiber, are especially useful in wringer applications in strongly alkaline environments and in the presence of oils. The invention rolls may also be deployed in environments where they are exposed to oxidizing acids, such as those encountered in passivating the surfaces of steel coil. Additional applications of the inventive rolls include deployment in steel coil electroplating operations, wherein the inventive rolls may be interchanged between environments exposing them to tin plating solutions and chrome plating solutions without detriment to their performance as a wringer roll. The non-woven articles of this invention can be configured into many convenient shapes useful for the surface conditioning of metal sheets. Exemplary of such useful shapes include roll shapes useful as rotatable mill rolls and slab or bar shapes useful as static or moveable wiper bars in metal sheets fabrication and processing operations.

The fibers used to make the non-woven fabric or web preferably comprise, in part, polyolefin polymers because of their resistance to acidic and basic aqueous liquids at moderately elevated temperatures. Preferably, the polyolefin fibers will have a tenacity greater than about 1 gram per denier to ensure adequate strength. It will be appreciated fiber compositions other than the foregoing polyolefin fibers may be used in the articles of the invention, especially if the finished article is to be used in an environment devoid of extremely acidic or alkaline conditions. Polyamide or polyester fibers may be successfully used where a resultant surface conditioning roll of this invention is to be operated so as to encounter only mildly acidic, mildly basic, or neutral treating solutions. Also, carbon fibers, and natural fiber materials such as cotton, wool, and the like, and inorganic fiber materials such as glass and alumina based-fibers, are all contemplated as useful in the aforementioned discrete non-woven elements used in the formation of the articles of the present invention.

As used herein, the term "polyolefin fiber" means a fiber that consists of at least 10 percent by weight of a polyolefin polymer-based composition. Moreover, the polyolefin material is present in the major outer surface regions of the fiber so that where the fiber comprises less than 100 percent of a polyolefin polymer-based composition, the polyolefin polymer-based composition will be disposed at least along the major surface of the fiber to cover the fiber along its length and to surround its perimeter.

Suitable polyolefin fibers include sheath-and-core fibers comprising a sheath of polyolefin polymer-based composition and a core comprising another material. In such bicomponent fibers, preferably only the ends of the core component are exposed. The term "polyolefin polymer-based composition" refers to a material wherein the major organic polymeric component is polyolefin polymer. The fiber composition may also include known additives, fillers, and the like. Polyolefin fibers used herein preferably can withstand solutions that have a pH of less than 1 and as high as 14.

Polyolefin fibers having linear densities from about 1 to about 50 denier are suitable for use in the articles of the invention and a range from about 1 to about 30 denier is preferred. Rolls made with excessively fine fibers will not provide adequate resistance to physical damage and excessively coarse fibers will provide articles unable to provide an adequate wringer action in surface treating applications. Fiber lengths can be virtually continuous, as in the case of spunbonded webs, or the fibers can be of finite length (e.g., crimped staple fiber). For air laid or carded webs, for example, crimped staple fibers having a length ranging from about 25 to 100 millimeters are preferred. The crimped staple fibers are only slightly crimped to obtain webs with suitable strength to withstand processing of the unbonded web.

Polyethylene, polypropylene, and polybutylene are examples of preferred polyolefins used in the practice of the present invention. Among these, isotactic polypropylene is most preferred. As mentioned, sheath:core bicomponent fibers may be used. Preferred bicomponent fibers are those having a sheath component comprising polyolefin polymer with a core component comprising another polyolefin composition or a polymeric composition other than a polyolefin. One preferred sheath:core bicomponent fiber is one which comprises an isotactic polypropylene sheath and a nylon core (50 percent sheath; 50 percent core by volume), the fiber having a draw ratio from about 2.5:1 to 3.5:1, and preferably about 3:1. Preferred materials for use in the aforementioned bicomponent fiber include polypropylene, commercially available under the trade designation "Exxon 3445" from Exxon Corporation, Houston, Tex.; and nylon 6, commercially available under the trade designation "BASF Ultramid B3 Natural" from BASF of Parsippany, N.J. In the manufacture of these bicomponent fibers, a 10 percent aqueous solution of a fiber finish material, commercially available under the trade designation "Dacospin FT504" from Henkel Chemical Corp., LaGrange, Ill. is used as a fiber processing lubricant. The film finish solution is used in a known manner to provide an increase in the fiber wet add-on weight of about 1 percent. Such bicomponent fibers may be made by conventional coextrusion techniques.

Spunbonded non-woven webs comprising the aforementioned polyolefin fibers are preferably strengthened by consolidation in a needle tacking operation after web formation and prior to the application of bonding agent to the web. The needle tacking operation is performed in a known manner wherein barbed or felting needles are forced through the web to further entangle the fibers and thereby consolidate the web. Spunbonded polypropylene, when compacted (e.g., by needle tacking) and bonded with a suitable bonding agent, provides useful web element elements for the formation of rolls and the like.

One preferred non-woven web suitable for use in preparing the web elements to be used in the articles of the invention is a carded, needle-tacked, non-woven web having a web weight of about 271 grams/meter$^2$ and comprising a mixture of isotactic polypropylene staple fibers of different linear densities. Such a mixture of fibers includes (1) 50 percent by weight of 10 denier by 3.25 inches (11 decitex by 83 millimeters) fibers and (2) 50 percent by weight of 8 denier by 4 inches (9 decitex by 102 millimeters) fibers. The foregoing web is commercially available from Synthetic Industries, Inc., Chickamauga, Ga., under the trade designation "Synfab" style S-0805.

The fibers used in the present invention need not form a non-woven web. Other types of web designs are suitable but less preferred. Examples of other types of web designs include woven, knitted, or other like construction.

The web elements of the present invention include fibers and a bonding agent to bond the fibers of the web elements to one another at their mutual contact points within each web element.

Bonding agents suitable for the present invention must adhere well to the fiber present within the web elements and retain their resilience under dynamic conditions. The preferred bonding agent is nitrile rubber, commercially available under the trade designation "Hycar 1581" from B. F. Goodrich Specialty Chemicals, Cleveland, Ohio. Bonding agents suitable for use in the present invention are polymeric, film formers (i.e., able to form a continuous coating on the fibers of the web), inherently resistant to chemical attack, especially oxidizing agents, and have a glass transition temperature between −30 and +10° C. Other bonding agents useful for practice of the present invention include, in part, polychloroprene, styrene butadiene rubber, polysulfide, silicone, polyepichlorohydrin, and combinations thereof.

The bonding agent is applied, in a liquid state to a non-woven web, in an amount that impregnates or saturates the web, and permits bonding of adjacent fibers at least at their points of intersection and contact. The liquid state of the bonding agent preferably has a viscosity of about 10 centipoise to 5,000 centipoise and a solid content of 30 to 60 percent. The bonding agent may be applied to the web in any convenient manner, such as by dip coating, roll coating, spray coating, or a combination thereof. Preferably, the bonding agent is applied to the non-woven web by dip coating, and the saturated web element is then passed through a pair of nip rolls which are capable of providing sufficient pressure to the saturated web.

The saturated web is heated in an oven to at least dry the bonding agent. In a preferred embodiment, the saturated web is heated at about 80–130° C. for about 3 to 10 minutes to volatilize water from the bonding agent.

One method, for example, of making a self-healing roll of the present invention begins with a plurality of web elements. Web elements (e.g., discs 1 of FIG. 1 and as described above) of desired dimensions may be die cut or stamped from a web element. The web elements may be disc shaped, as discussed above, or they may be in another suitable form as determined by known criteria such as the contemplated end use of the finished article. A plurality of like web elements are then assembled into an ordered stack or pile of elements. The pile may be assembled along a support shaft, hollow tube, or along a mandrel, for example, so that the elements are all oriented in the pile in substantially the same manner, similar to the manner in which the discs 22 are oriented along shaft 23 in FIG. 2.

The pile is then compacted under a compaction force. In one aspect of the method for the manufacture of the inventive articles, the compaction pressure applied at this stage is sufficient to provide a desired density for the finished roll as may readily be determined by those practicing in the field. Preferably, the compaction force applied to the web elements is sufficient to provide a density of at least about 244 kilograms/meter$^3$ and generally less than about 960 kilograms/meter$^3$. A suitable compaction force to obtain the foregoing densities is typically within the range from about 1 by 10$^6$ to 7 by 10$^6$ Pascal. The compaction force is applied in an axial direction against the end faces "f" (FIG. 2) of the roll-shaped pile 21 by a suitable pressing device, such as a horizontal or vertical compactor, commercially available from Remmele Engineering Inc., St. Paul, Minn.

The compacted pile is then restrained in its compacted configuration by suitable means such as by bonding of the discs within the pile to one another, or by mechanical means, such as by locking collars, adapted to be slidable and mechanical engagable with the shaft. The locking collar provides positive pressure against the disc faces "f" and serve to position the roll at a designed position along the shaft while preventing slippage there along, all in a known manner. As an alternative to mounting the discs directly on a support shaft, such as shaft 23, those skilled in the art will appreciate that a plurality of discs 22 may be mounted, compacted, and then restrained on a hollow open-ended tube (not shown) of adequate strength to withstand compacting. The cross sectioned configuration of the tube may be circular, square, or otherwise shaped and may include appendages to accommodate key slots in the central openings of the discs. The tube will have an opening therethrough coextensive with its longitudinal axis to then permit mounting of the tube onto an appropriate support shaft having a cross sectional configuration substantially identical to the that of the foregoing tube.

Additionally, a roll can be formed along a mandrel, which is removed after the roll body has been formed. Upon removal of the mandrel, the roll comprises the compacted pile of non-woven web elements or discs adhesively secured to one another in their compacted state. The central opening through the pile may be further cut or profiled along the cylindrical axis of the pile to permit positioning of the roll along a preexisting shaft and to accommodate the aforementioned drive keys. Details of the manufacture of the foregoing articles are further discussed below.

Under the foregoing compaction pressures, the major surfaces of the individual web elements are pressed together and maintain intimate contact with one another. The compacted pile may then be heated. This heating facilitates bonding between the layers of the web element making up the roll. When heated, the bonding agent on the web elements may further bond the fibers of the individual web elements at their mutual contact points and bond adjacent web elements to one another to form a cohesive roll body. Bonding is accomplished by heating the compacted pile at about 100° C. to about 140° C. for a sufficient amount of time. The actual heating time will depend on the overall size of the article and may range from about 10 to 40 hours. The heated pile is allowed to cool to room temperature, and if needed, the surface of the pile may be machined to obtain a finished article suitable for surface conditioning operations.

If the article is formed on a mandrel, the mandrel may be removed from the pile to provide a roll in the form of a cylinder with a central opening extending therethrough. The central opening of the compacted pile may be modified to accommodate a keyed support shaft by use of the apparatus and method described in U.S. Pat. No. 5,247,740 (Curtis et al.), whereby a cutter is moved coaxially relative to the center opening in the compacted roll. The cylindrical roll body may be positioned along an appropriately shaped support shaft and held in place by suitable means such as by locking collars.

In a modification of the foregoing method of manufacture, an additional bonding agent may also be added to facilitate bonding of the web elements. If desired, the compaction step is performed by applying a first compaction force to the stacked pile of web elements. The first compaction force is less than that required to provide a desired density for the finished article, as determined by the skilled artisan. Additional bonding agent (either the same bonding agent, a different bonding agent, or a mixture of bonding agents) may be added to the compacted pile in a known manner. The pile is then further compacted to achieve the desired density, and the bonding agent(s) are hardened, as described above. The roll body may be dressed by grinding to provide an outer surface suitable for the intended use of the finished roll.

The final concentration of bonding agent on the roll is at least 60 percent, and preferably between 66 percent and 70 percent of the weight of the roll. The final void volume on the roll is between 2 to 30 percent and preferably between 5 to 20 percent. The void volume of a roll depends on a number of factors, in part, the amount of bonding agent added to the roll, the amount of force used to compact the web elements of the roll, and the thickness of the fibers. Decreasing the void volume of the roll by adding additional bonding agent is observed to most dramatically enhance the self-healing property of the roll. In addition, increasing the volume of nitrile rubber used to form the roll results in a roll being resistant to the oxidizing agent, chromic acid. Nitrile rubber is known to be sensitive to such oxidizing agents. The roll typically has a Shore A hardness in the range of 70 to 93; however, it is preferred that the roll has a Shore A hardness in the range of 75 to 85.

A very porous article with a large void volume will absorb a lot of liquid when used in a continuous production line, such as the surface modification of metal sheets. If the production line is shut down, the rolls may become dry as the circulation of liquids has ceased. The chemicals present in the rolls may crystallize and modify the nature of the roll from compliant to stiff. The rolls of the present invention have a void volume that allow the rolls to be absorbent, but when dried, the physical characteristics of the rolls are not changed. Typically, the rolls of the present invention, when saturated with one or more chemicals, preferably chromic acid, are functional even after they have become dry.

While the present invention has been described with reference to a cylindrical roll, those skilled in the art will appreciate that the invention also encompasses mill wipes or wiper bars, bars, slabs, or any other surface conditioning article formed by stacking and compressing web elements to form a compacted pile.

In addition to surface conditioning applications, the rotatable rolls of this invention may also be used as drive, tension/bridle rolls and support rolls to advance metal sheets and strips during processing and finishing, for example. Wiper bars of this invention also can be used as guides on conveyors or in other material handling applications.

The features and advantages of the invention are further illustrated by the following non-limiting examples. All parts, percentages, ratios, and so forth, in the examples are by weight unless otherwise indicated.

EXAMPLES

Test Procedure I: Self-Healing Test

The performance of test rolls was evaluated after being controllably damaged by simulating some of the severe conditions that might be encountered in steel strip processing lines. To damage the test roll, a "chopper blade" (a triangular shaped piece of steel) was secured with tape to a steel roll of a two roll set which included the test roll and the steel roll. The "chopper blade" was formed from a triangular shaped piece of cold rolled steel about 1.5 millimeters thick. The triangular piece of steel was approximately 75 millimeters by 75 millimeters by 100 millimeters and had four pointed protrusions on each 75 millimeters edge. The protrusions were formed from the metal triangle by bending at a right angle a cut segment of that edge. All protrusions were nearly the same shape and size and were 5 millimeters high. The test roll and the steel roll were then forced together under a load of 13.4 kilograms/centimeter of width and rotated for one minute to inflict severe damage to the fabric roll. The chopper blade was then removed and the test roll operated for 24 hours at a loading 13.4 kilograms/centimeter of width to allow the test roll to "heal" prior to evaluation of the wringing efficiency. The amount of water passed by the rolls was again measured (after 24 hours) using the squeegeeing efficiency test method described in U.S. Pat. No. 4,669,163 (Lux et al.).

Example 1

Production of a Non-woven Web Element

A carded, crosslapped, needletacked nonwoven fabric weighing 271.5 grams/meter$^2$ having a thickness of 2.03 millimeters was coated with a bonding agent, nitrile rubber. The fabric is commercially available under the trade designation "Synfab" style S-0805 from Synthetic Industries, Inc. A web element was produced comprising 50 percent by weight nitrile rubber and 50 percent by weight fabric. The nitrile rubber used had a 45 percent solids water dispersion and was commercially available under the trade designation "Hycar 1581" from B. F. Goodrich Specialty Chemicals. A 2-roll coater and a dip and wring technique was used to apply the nitrile rubber to the fabric. The coating was dried by heating to 110° C. for 6 minutes. The coating and drying steps were repeated to achieve a final bonding agent:fabric weight ratio of 66⅔ percent nitrile rubber to 33⅓ percent fabric.

Example 2

Method of Making a Roll and of Characterizing the Roll's Resistance to an Oxidizing Agent The coated fabric prepared as Example 1 was die cut into annular shapes of dimensions 11 inches outside diameter by 6 inches inside diameter (27.9 centimeters by 15.2 centimeters). These annuli were then stacked concentrically onto a steel shaft. The stack of was saturated with tap water and compressed with sufficient force to provide a 195.6 centimeters cylinder. The compression machine was a horizontal compactor, commercially available from Remmele Engineering Inc. The compressed stack was then restrained mechanically with flanges and heated in an oven at 135° C. for 24 hours. The resulting cylinder was cooled, removed from the steel shaft, mounted on a "production shaft", further compacted and restrained with flanges to a 137.2 centimeters cylinder, and then dressed in a lathe to provide a smooth and uniform working surface of 25.4 centimeters diameter. The hardness of the resulting cylinder was 80 Shore A. The roll had a measured void volume of about 21 percent. Two such rolls were made in this fashion. The rolls were installed in a wringer position after a "chem treat" tank in a steel coil conditioning plant, where it was subjected to an oxidizing agent called Oakite F1, commercially available from Oakite Products, Inc. Oakite F1 comprises approximately 20 to 30 percent chromic acid, 20 percent to 30 percent phosphoric acid, up to 10 percent nitric acid, and 5 percent polyvinyl alcohol. The rolls were heated to about 43° C. by the incoming hot steel. Aggressive mechanical forces were encountered during these continued operations (production targets are 40 pounds pressure per inch of roll face and a steel coil speed of 400 feet per minute). Under such conditions, previously employed rubber rolls were expected to last 4 weeks before replacement. The inventive rolls have been in production for 5 weeks and continue to perform well.

Example 3

A carded, crosslapped, needletacked non-woven fabric weighing 271.5 grams/meter$^2$ having a thickness of 2.03 millimeters was coated with an ABS terpolymer. The fabric is commercially available under the trade designation "Synfab" style S-0805 from Synthetic Industries, Inc. A web element was produced comprising by weight, 50 percent bonding agent (ABS terpolymer) and 50 percent fabric. The ABS terpolymer, as a liquid, comprises a 50 percent solids water dispersion, and was commercially available under the trade designation "Hycar 1578X1" from B. F. Goodrich Specialty Chemicals. A 2-roll coater and a dip and wring technique was used to apply the ABS terpolymer to the fabric. The coating was dried by heating the web element to 110° C. in a convection oven for 6 minutes. Annuli of dimension 6.5 inches outside diameter by 2 inches inside diameter (16.5 centimeters by 5.1 centimeters) were die cut to produce disc shape web elements. The web elements were stacked concentrically onto a steel shaft, saturated with tap water, and compacted to a void volume of about 48 percent. The compacted web elements were mechanically restrained with flanges. The compacted stack was then heated in a convection oven for 16 hours at 135° C., then cooled to room temperature. The resulting roll was dressed on a lathe to provide a smooth working surface of final outside diameter of 6.1 inches (15.5 centimeters). The hardness of the roll article was 82.4 Shore A.

Example 4

A carded, crosslapped, needletacked non-woven fabric weighing 271.5 grams/meter$^2$ having a thickness of 2.03 millimeters was coated with a nitrile rubber and is commercially available under the trade designation "Synfab" style S-0805 from Synthetic Industries, Inc. The nitrile rubber, as a liquid, is a 45 percent solids water dispersion and is commercially available under the trade designation "Hycar 1581" from B. F. Goodrich Specialty Chemicals, Cleveland, Ohio. A 2-roll coater and a dip and wring technique was used to apply the nitrile rubber to the fabric. The coating and drying steps were repeated once to produce a web element comprising 66⅔ percent bonding agent (nitrile rubber) and 33⅓ percent fabric. Each coating was dried by heating to 110° C. in a convection oven for 6 minutes. Annuli of dimension 6.5 inches outside diameter by 2 inches inside diameter (16.5 centimeters by 5.1 centimeters) were die cut forming disc shape web elements. The web elements were stacked concentrically onto a steel shaft, saturated with tap water, compacted to a void volume of about 22 percent, and mechanically restrained with flanges. The compacted stack was then heated in a convection oven for 16 hours at 135° C., then cooled to room temperature. The resulting roll was then dressed on a lathe to provide a smooth working surface of final outside diameter of 6.1 inches (15.5 centimeters). The hardness of the roll article was 79.8 Shore A.

The ability of the rolls of Examples 3 and 4 to self-heal was measured using Test Procedure 1. The results of the test are illustrated in FIG. 3.

Figure 3:
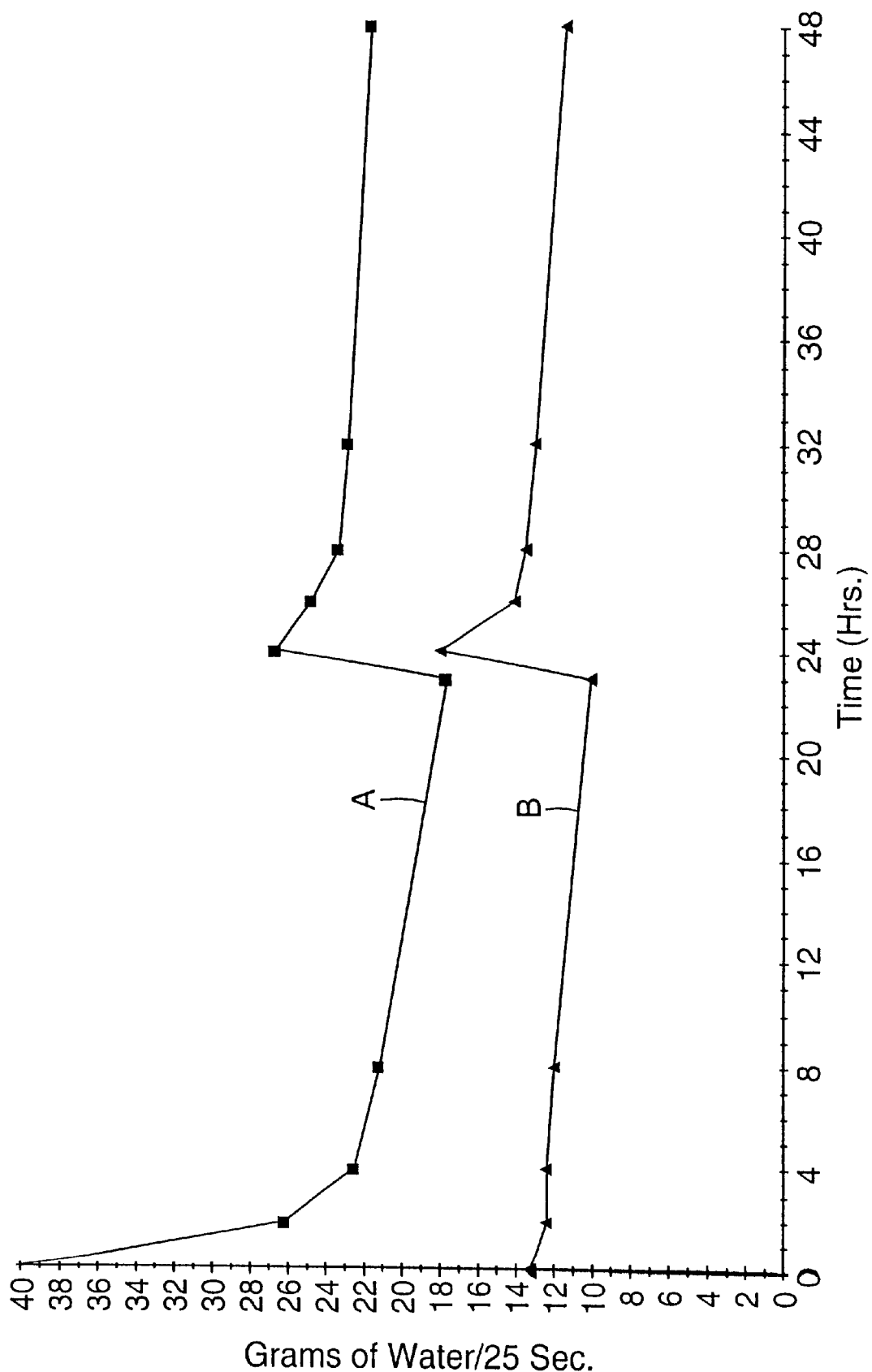
FIG. 3 is a graph illustrating the self-healing characteristics of a roll of the present invention.

The roll of Example 3 was monitored by measuring the water passed by the roll as depicted in FIG. 3 as line A. The roll of Example 4 was monitored by measuring the water passed by the roll as depicted in FIG. 3 and line B. The roll of Example 3 passes substantially higher quantities of water compared to the roll of Example 4. The roll of Example 4 has little or no break-in period compared to the roll of Example 3 (points at 0 to 4 hours) and the roll of Example 4 has a quicker healing period after damage than the roll of Example 3 (points at 24 to 26 hours).

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

We claim:

1. A self-healing article suited for use in the surface conditioning of sheets, the article comprising:
    a plurality of stacked, compacted web elements, the web elements comprising entangled fibers bonded together at points of mutual contact by a bonding agent comprising material selected from the group consisting of polychloroprene, styrene butadiene rubber, polysulfide, silicone, polyepichlorohydrin, and combinations thereof, wherein the article is resistant to an oxidizing agent and has a Shore A hardness in the range of 70 to 93 and a void volume in the range of 2 to 30 percent.

2. The article of claim 1, wherein the article has a Shore A hardness in the range of 75 to 85.

3. The article of claim 1, wherein the article has a void volume in the range of 5 to 20 percent.

4. The article of claim 1, wherein the bonding agent has a glass transition temperature in the range of −30 to +10° C.

5. The article of claim 1, wherein the bonding agent further comprises said nitrile rubber.

6. The article of claim 5, wherein the article has a Shore A hardness in the range of 75 to 85.

7. The article of claim 5, wherein the article has a void volume in thg range of 5 to 20 percent.

8. The article of claim 5, wherein the bonding agent has a glass transition temperature in the range of −30 to +10° C.

9. The article of claim 5, wherein the web elements are made of a non-woven material.

10. The article of claim 5, wherein the oxidizing agent is selected from the group consisting of chromic acid, nitric acid, phosphoric acid, and combinations thereof.

11. The article of claim 5, wherein the article has a final concentration of bonding agent of 66 percent by weight or greater, by weight.

12. The article of claim 5, wherein the article has a final concentration of bonding agent in the range from 66 to 70 percent by weight or greater, by weight.

13. The article of claim 1, wherein the web elements are made of a non-woven material.

14. The article of claim 1, wherein the oxidizing agent is selected from the group consisting of chromic acid, nitric acid, phosphoric acid, and combinations thereof.

15. The article of claim 1, wherein the article has a final concentration of bonding agent of 66 percent by weight or greater, by weight.

16. The article of claim 1, wherein the article has a final concentration of bonding agent in the range from 66 to 70 percent by weight or greater, by weight.

17. A self-healing roll suited for surface conditioning of sheets, the roll comprising:
    a cylindrical body supported on its cylindrical axis for rotation, the cylindrical body comprising a plurality of compacted, stacked, disc-shaped non-woven web elements, the web elements each comprising entangled fibers, wherein adjacent fibers in each web element are bonded together at points of mutual contact by a bonding agent comprising material selected from the group consisting of polychloroprene, styrenue butadiene rubber, polysulfide, silicone, polyepichlorohydrin, and combinations thereof, wherein the roll is resistant to an oxidizing agent, has a Shore A hardness in the range of 70 to 93 and a void volume in the range of 2 to 30 percent.

18. The roll of claim 17 wherein the roll has a Shore A hardness in the range of 75 to 85.

19. The roll of claim 17, wherein the roll has a void volume in the range of 5 to 20 percent.

20. The roll of claim 17, wherein the bonding agent has a glass transition temperature in the range of −30 to +10° C.

21. The roll of claim 17, wherein the bonding agent further comprises said nitrile rubber.

22. The roll of claim 21 wherein the roll has a Shore A hardness in the range of 75 to 85.

23. The roll of claim 21, wherein the roll has a void volume in the range of 5 to 20 percent.

24. The roll of claim 21, wherein the bonding agent has a glass transition temperature in the range of −30 to +10° C.

25. The roll of claim 21, wherein the web element is non-woven material.

26. The roll of claim 21, wherein the oxidizing agent is selected from the group consisting of chromic acid, nitric acid, phosphoric acid, and combinations thereof.

27. The roll of claim 21, wherein the article has a final concentration of bonding agent of 66 percent by weight or greater, by weight.

28. The roll of claim 21, wherein the article has a final concentration of bonding agent in the range from 66 to 70 percent by weight or greater, by weight.

29. The roll of claim 19, wherein the web element is non-woven material.

30. The roll of claim 17, wherein the oxidizing agent is selected from the group consisting of chromic acid, nitric acid, phosphoric acid, and combinations thereof.

31. The roll of claim 17, wherein the article has a final concentration of bonding agent of 66 percent by weight or greater, by weight.

32. The roll of claim 17, wherein the article has a final concentration of bonding agent in the range from 66 to 70 percent by weight or greater, by weight.

33. A method of making a self-healing and non-woven article suited for the surface conditioning of sheets comprising the steps of:

providing a plurality of non-woven web elements, the web elements comprising entangled fibers bonded at their points of mutual contact by a bonding agent comprising material selected from the group consisting of polychloroprene, styrene butadiene rubber, polysulfide, silicone, polyepichlorohydrin, and combinations thereof;

stacking the plurality of non-woven web elements into a pile;

compacting the pile under a compaction force; and restraining the pile in its compacted configuration to form an article so that the article is self-healing, resistant to oxidizing agents, has a Shore A hardness in the range of 70 to 93 and a void volume in the range of 2 to 30 percent.

34. The method of claim 33, comprising the step of adding water to the non-woven web elements prior to compacting the pile under compaction force.

35. The method of claim 33, wherein the bonding agent comprises said nitrile rubber.

36. A method of making a self-healing and non-woven article suited for the surface conditioning of sheets comprising the steps of:

providing a plurality of non-woven web elements, the web elements comprising entangled fibers bonded at their points of mutual contact by a bonding agent comprising material selected from the group consisting of polychloroprene, styrene butadiene rubber, polysulfide, silicone, polyepichlorohydrin, and combinations thereof;

stacking the plurality of non-woven web elements into a pile;

compacting the pile under a compaction force;

restraining the pile in its compacted configuration;

heating the pile in its compacted configuration to an elevated temperature to integrally bond the layers; and cooling the heated pile to provide an article that is self-healing, resistant to an oxidizing agent, and has a Shore A hardness in the range of 70 to 93 and a void volume in the range of 2 to 30 percent.

37. The method of claim 36, comprising the step of adding water to the non-woven web elements prior to compacting the pile under compaction force.

38. The method of claim 36 wherein the bonding agent further comprises said nitrile rubber.

39. A method of making a self-healing and non-woven article suited for the surface conditioning of sheets comprising the steps of:

providing a plurality of non-woven web elements, the web elements comprising entangled fibers bonded at their points of mutual contact by a bonding agent comprising nitrile rubber and water;

stacking the plurality of non-woven web elements into a pile;

compacting the pile under a compaction force;

restraining the pile in its compacted configuration; and volatilizing the water in said bonding agent to form an article so that the article is self-healing, resistant to oxidizing agents, has a Shore A hardness in the range of 70 to 93 and a void volume in the range of 2 to 30 percent.

* * * * *

UNITED STATES PATENT AND TRADEMARK OFFICE
CERTIFICATE OF CORRECTION

PATENT NO.    : 6,300,261 B1  
DATED         : October 9, 2001  
INVENTOR(S)   : Young, John B.

It is certified that error appears in the above-identified patent and that said Letters Patent is hereby corrected as shown below:

<u>Title page,</u>  
Item [56], References Cited, OTHER DOCUMENTS, please include: -- 3M Brochure, "MillRolls-Improve coil line productivity while sawing on roll maintenance costs", 1997 --.

<u>Column 3,</u>  
Line 66, insert -- to -- following "Referring" and preceding "FIG. 1".

<u>Column 7,</u>  
Line 56, delete "the" following "to" and preceding "that".  
Line 67, "arc" should read -- are --.

<u>Column 10,</u>  
Line 8, delete "of" following "stack" and preceding "was".

<u>Column 11,</u>  
Line 29, "and" should read -- as --.

<u>Column 12,</u>  
Line 33, "styrenue" should read -- styrene --.  
Line 63, "19," should read -- 17, --.

Signed and Sealed this

Eighth Day of July, 2003

JAMES E. ROGAN  
*Director of the United States Patent and Trademark Office*